US012736710B2

(12) United States Patent
Gao et al.

(10) Patent No.: US 12,736,710 B2
(45) Date of Patent: Sep. 15, 2026

(54) OBSTRUCTION DETECTING APPARATUS, OBSTRUCTION DETECTING SYSTEM, ELECTRIC LIFTING DESK, AND ELECTRIC LIFTING CUPBOARD

(71) Applicant: ZHEJIANG JIECANG LINEAR MOTION TECHNOLOGY CO., LTD., Shaoxing (CN)

(72) Inventors: Zefeng Gao, Shaoxing (CN); Bingbing Ren, Shaoxing (CN); Lidong He, Shaoxing (CN); Chuanchao Zhu, Shaoxing (CN)

(73) Assignee: ZHEJIANG JIECANG LINEAR MOTION TECHNOLOGY CO., LTD., Shaoxing (CN)

( * ) Notice: Subject to any disclaimer, the term of this patent is extended or adjusted under 35 U.S.C. 154(b) by 358 days.

(21) Appl. No.: 18/698,925

(22) PCT Filed: Jan. 9, 2023

(86) PCT No.: PCT/CN2023/071172
§ 371 (c)(1),
(2) Date: Apr. 5, 2024

(87) PCT Pub. No.: WO2023/142984
PCT Pub. Date: Aug. 3, 2023

(65) Prior Publication Data
US 2024/0402382 A1 Dec. 5, 2024

(30) Foreign Application Priority Data
Jan. 28, 2022 (CN) ......................... 202210107987.1

(51) Int. Cl.
*H01H 13/14* (2006.01)
*G01V 9/00* (2006.01)
(Continued)

(52) U.S. Cl.
CPC ............... *G01V 9/00* (2013.01); *H01H 13/04* (2013.01); *H01H 13/10* (2013.01); *H01H 13/32* (2013.01)

(58) Field of Classification Search
CPC .......... G01V 9/00; H01H 13/04; H01H 13/10; H01H 13/32; H01H 3/42; H01H 13/186;
(Continued)

(56) References Cited

U.S. PATENT DOCUMENTS 4,131,830 A * 12/1978 Lee ....................... E05F 15/673 318/266
6,236,002 B1 5/2001 Chou
10,139,309 B2 * 11/2018 Wong ...................... G01M 7/08

FOREIGN PATENT DOCUMENTS

CN 210384063 * 5/2019 ............ E05F 15/673
CN 210384063 U 4/2020
(Continued)

OTHER PUBLICATIONS

Apr. 3, 2023 International Search Report issued in International Patent Application No. PCT/CN2023/071172.
(Continued)

*Primary Examiner* — Ahmed M Saeed
(74) *Attorney, Agent, or Firm* — Oliff PLC

(57) ABSTRACT

An obstruction detecting apparatus, an obstruction detecting system, an electric lifting desk, and an electric lifting cupboard, which relate to the field of obstruction detection and render a higher obstruction detection sensitivity. The obstruction detecting apparatus includes a first housing and a second housing, the second housing being floatingly mounted on the first housing via a first elastic member, on the first housing being provided a circuit board, an obstruction detecting switch connected to the circuit board, and a rocking element rotatably mounted, one end of the rocking element being a free end abutting against the second housing
(Continued)

opposite end of the rocking element being a pressing end pressing down on the obstruction detecting switch, the free end, when being rotated, driving the pressing end to be disengaged from the obstruction detecting switch, whereby an obstruction signal is generated.

9 Claims, 4 Drawing Sheets

(51) Int. Cl.
*H01H 13/04* (2006.01)
*H01H 13/10* (2006.01)
*H01H 13/32* (2006.01)

(58) Field of Classification Search
CPC .... H01H 2221/064; H01H 3/16; H01H 13/18; A47B 2200/0056; A47B 2200/0062; A47B 9/00; A47C 1/0242; A47C 7/62; A47C 1/02; A47C 1/03211; A47C 1/034; A47C 1/0345; A47C 17/04; A47C 31/00; A47C 7/72
See application file for complete search history.

(56) References Cited

FOREIGN PATENT DOCUMENTS

| | | | |
|---|---|---|---|
| CN | 111758374 | A | 10/2020 |
| CN | 214152753 | U | 9/2021 |
| CN | 215177864 | U | 12/2021 |
| CN | 216900984 | U | 7/2022 |
| EP | 1353349 | A2 | 10/2003 |
| KR | 10-2004-0068627 | A | 8/2004 |

OTHER PUBLICATIONS

Apr. 3, 2023 Written Opinion issued in International Patent Application No. PCT/CN2023/071172.

Dec. 20, 2024 Search Report issued in European Patent Application No. 23745869.0.

Apr. 30, 2025 Office Action issued in Chinese Patent Application No. 202210107987.1.

* cited by examiner

OBSTRUCTION DETECTING APPARATUS, OBSTRUCTION DETECTING SYSTEM, ELECTRIC LIFTING DESK, AND ELECTRIC LIFTING CUPBOARD

FIELD

The disclosure relates to obstruction detection, and more particularly relates to an obstruction detecting apparatus, an obstruction detecting system, an electric lifting desk, and an electric lifting cupboard.

BACKGROUND

An anti-collision system generally comprises a sensor and a controller; when the sensor detects an obstruction, the controller controls a motion mechanism to move reversely. A mechanical sensor uses a touch control-type pushbutton switch, which has advantages such as reliable control without false alerts and is thus extensively applied to anti-collision systems.

However, in practical applications, the mechanical sensor has a low sensitivity, so that during the time interval between electrical signal state change of the pushbutton switch and reversal movement of the motion mechanism, the motion mechanism would continue the original moving momentum due to inertia of an electric motor after the controller receives the electrical signal to control the electric motor to act. Therefore, conventional pushbutton switch-type anti-collision systems are practically only applicable to anti-collision scenarios with a low-speed motion mechanism.

SUMMARY

To overcome the drawbacks in conventional technical technologies, the disclosure provides an obstruction detecting apparatus, which is highly sensitive in obstruction detection.

The technical solution adopted by the disclosure is set forth below:

An obstruction detecting apparatus, comprising a first housing and a second housing, the second housing being floatingly mounted on the first housing via a first elastic member, on the first housing being provided a circuit board, an obstruction detecting switch connected to the circuit board, and a rocking element rotatably mounted, one end of the rocking element being a free end abutting against the first housing, opposite end of the rocking element being a pressing end pressing down on the obstruction detecting switch, the free end, when being rotated, driving the pressing end to be disengaged from the obstruction detecting switch, whereby an obstruction signal is generated.

Based on the above solution, a distance between the free end and a center of rotation of the rocking element is greater than a distance between the pressing end and the center of rotation of the rocking element.

Based on the above solution, a boss oriented towards the first housing is provided on the second housing, the boss maintaining engagement with the free end.

Based on the above solution, a second elastic member is provided on the first housing or the second housing, the second elastic member applying, against the rocking element, an elastic force causing the free end to keep abutting against the second housing.

Based on the above solution, a pin shaft is provided on the first housing, the rocking element being rotatably mounted on the pin shaft, the free end being formed by inclined extension of the rocking element from a position of the pin shaft towards the second housing, the pressing end being formed by inclined extension of the rocking element from the position of the pin shaft towards the obstruction detecting switch.

Based on the above solution, a pin shaft is provided on the first housing, the pressing end being of a cam shape and rotatably fitted with the pin shaft, the free end being formed by inclined extension of the rocking element from the pressing end towards the second housing.

Based on the above solution, a snap is provided on one of the first housing and the second housing, and a catch groove fitted with the snap is provided on the other one of the first housing and the second housing, the snap being slidably mounted in the catch groove.

Based on the above solution, the first elastic member is a spring, and a spring slot for mounting the spring is provided on the first housing and/or the second housing.

Based on the above solution, multiple obstruction detecting switches and multiple rocking elements are provided between the first housing and the second housing.

An obstruction detecting system comprises a first board body and a second board body, a plurality of obstruction detecting apparatuses being disposed between the first board body and the second board body, the obstruction detecting apparatuses being the obstruction detecting apparatus stated supra, the first housing being securely connected to the first board body, the second housing being securely connected to the second board body.

An electric lifting desk comprises the obstruction detecting system stated supra.

An electric lifting cupboard comprises the obstruction detecting system stated supra.

The disclosure offers the following benefits:

The obstruction detecting apparatus disclosed herein may be installed on a piece of equipment so that the equipment has an obstruction detecting feature. The equipment may be an electric lifting desk, an electric lifting bed, and the like, which is highly demanding on obstruction detecting accuracy. The first housing and the second housing may move relative to each other. In a normal state, the first elastic member maintains a normal length, with the pressing end of the rocking element pressing down on the obstruction detecting switch, and when moving with the equipment, the obstruction detecting apparatus generally moves in a direction from the first housing towards the second housing or in a direction from the second housing towards the first housing. In an obstructed situation, movement of one of the first housing and the second housing is affected, with quick deceleration of movement speed; since the other housing still has inertia, the first housing and the second housing would move relative to each other, so that the spacing therebetween would be shrunk. The second housing pushes the free end of the rocking element to drive the rocking element to rotate, causing the pressing end to be disengaged from the obstruction detecting switch, whereby an obstruction signal may be generated.

In an existing technical solution, when an obstruction is encountered, an obstruction signal is generated by pressing a pushbutton switch; after the signal is detected, the equipment would still move due to a response time interval from system control to motor action as well as inertia of the motor. In contrast, in the present application, a small displacement of the second housing relative to the first housing may disengage the pressing end from the obstruction detecting switch, which reduces buffer button travel and eliminates actuation travel error of the pushbutton switch while realizing obstruction detection and reversal movement under circumstances of a fast moving speed, thereby preventing damages otherwise caused by further movement of the obstructed equipment; the more sensitive, reliable signal detection and control enables quick detection of occurrence of an obstruction, notably enhancing equipment safety. After the obstruction situation is cleared, the first housing and the second housing are reset by virtue of the elastic force of the first elastic member, and the pressing end of the rocking element is also reset to press down on the obstruction detecting switch, whereby the obstruction alarm is deactivated. The obstruction detection apparatus disclosed herein is applicable to equipment which is demanding on obstruction detection sensitivity, e.g., an electric lifting desk, which shall prevent people from getting pinched; the obstruction detection apparatus disclosed herein is also applicable to equipment with a fast-moving speed, where the high sensitivity prevents the equipment from moving farther upon encountering an obstruction.

Furthermore, a distance between the free end and a center of rotation of the rocking element is greater than a distance between the pressing end and the center of rotation of the rocking element. According to the lever principle, a small acting force against the free end would drive the rocking element to rotate, causing the pressing end to be disengaged from the obstruction detecting switch; in this way, the reactive force of the rocking element has little impact on the relative movement between the first housing and the second housing, which guarantees sensitivity of the obstruction detecting apparatus.

Furthermore, a boss oriented towards the first housing is provided on the second housing, the boss maintaining abutting against the free end. With the boss provided, the free end does not need direct contact with the second housing, which may reduce the length of rocking element, thereby preventing increase of assembly difficulty as well as increase of size of the obstruction detecting apparatus otherwise caused by a too long rocking element.

Furthermore, a second elastic member is provided on the first housing or the second housing, the second elastic member applying, against the rocking element, an elastic force causing the free end to keep abutting against the second housing. The elastic force of the second elastic member acts on the rocking element, so that the free end of the rocking element may keep abutting against the second housing; after the obstruction situation is cleared, the second housing and the first housing are reset, and the rocking element, under the action of the second elastic member, is also reset; in addition, under the action of the second elastic element, in a normal state, the rocking element can maintain a state of pressing down on the obstruction detecting switch so as to prevent false-positive obstruction signals.

Furthermore, a snap is provided on one of the first housing and the second housing, and a catch groove fitted with the snap is provided on the other one of the first housing and the second housing, the snap being slidably mounted in the catch groove. Fitting between the snap and the catch groove enables limitation of the second housing to the first housing, preventing separation between the first housing and the second housing.

Furthermore, the first elastic member is a spring, and a spring slot for mounting the spring is provided on the first housing and/or the second housing. Compared with an elastomer such as a silicone piece or a rubber piece, the spring has a better extensibility and retractability, which may be quickly deformed to generate an obstruction signal when the obstruction detecting apparatus encounters an obstruction. The spring slot is configured to receive an end portion of the spring so as to position the spring and limit radial displacement of the end portion position of the spring.

Furthermore, multiple obstruction detecting switches and multiple rocking elements are provided between the first housing and the second housing. If an obstructed position of the first housing and the second housing is away from a position of the rocking element, the first housing and the second housing need to move relative to each other for a certain distance so as to drive the rocking element to rotate; however, certain time already elapses from the time point when the equipment encounters the obstruction, and the amount of displacement of the equipment within this period of time would very likely have caused damages and accidents. By setting multiple obstruction detecting switches and multiple rocking elements, the obstruction detecting apparatus can always generate an obstruction signal quickly wherever the obstruction occurs.

The disclosure further provides an obstruction detecting system to which the obstruction detecting apparatus stated supra is applied. The obstruction detecting apparatus, which is of a small size, has a limited detection range when being applied to large-sized equipment, so that an obstruction signal cannot be timely generated. The obstruction detecting system employs a plurality of the obstruction detecting apparatuses, so that an obstruction signal can always be quickly generated wherever the first board body and the second board body are obstructed.

The disclosure further provides an electric lifting desk. The electric lifting desk belongs to smart furniture. With the obstruction detecting system described supra, the electric lifting desk has a high anti-collision capability; when the moving electric lifting desk encounters an obstruction which potentially pinches the user, the electric lifting desk may quickly detect the obstruction to prevent the user from being pinched.

The disclosure further provides an electric lifting cupboard. The electric lifting cupboard belongs to smart furniture. With the obstruction detecting system described supra, the electric lifting cupboard can quickly detect an obstacle in the way of up and down movement of a cupboard body of the electric lifting cupboard.

The above and other features and advantages of the disclosure will be described in detail below through specific example embodiments in conjunction with accompanying drawings.

BRIEF DESCRIPTION OF THE DRAWINGS

Hereinafter, the disclosure will be further illustrated with reference to the accompanying drawings.

Figure 1:
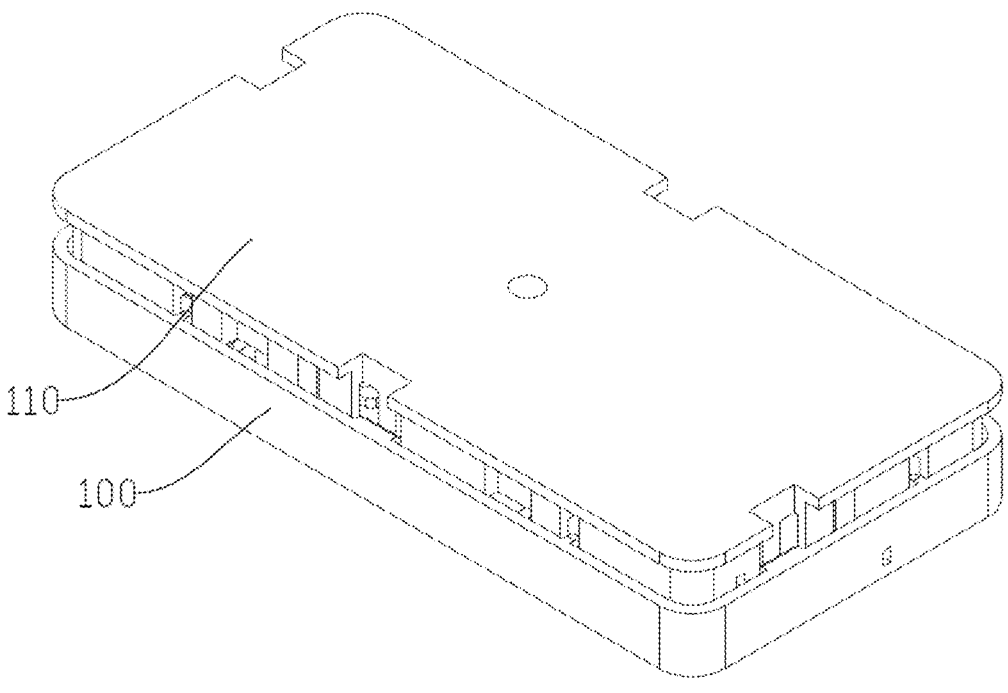
FIG. 1 is a structural schematic diagram of an obstruction detecting apparatus according to some embodiments of the disclosure.

REFERENCE NUMERALS first housing 100; second housing 110; boss 120; snap 130; catch groove 140; first encirclement 150; second encirclement 160;
first elastic member 200; spring slot 210;
circuit board 300; obstruction detecting switch 310;
rocking element 400; free end 410; pressing end 420; second elastic member 430; pin shaft 440;
first board body 500; second board body 510.

DETAILED DESCRIPTION OF EMBODIMENTS

Hereinafter, the technical solutions of the disclosure will be explained and illustrated through embodiments with reference to the accompanying drawings. However, the embodiments are only some embodiments of the disclosure, not all of them. Other embodiments obtained by those skilled in the art based on the examples in the embodiments without exercise of inventive work all fall within the protection scope of the disclosure.

The terms such as "exemplary" and "some example embodiments" referred to herein intend to mean "as an example, as an example implementation, or as an illustration"; no embodiments illustrated exemplarily shall be interpreted as preferred to or better than other embodiments. To better illustrate the disclosure, various details will be given in specific embodiments described infra; those skilled in the art shall understand that without some details, the disclosure can also be implemented.

Referring to FIGS. 1 to 4, embodiments of the disclosure provide an obstruction detecting apparatus, comprising a first housing 100 and a second housing 110, the second housing 110 being floatingly mounted on the first housing 100 via a first elastic member 200; on the first housing 100 are provided a circuit board 300, an obstruction detecting switch 310 connected to the circuit board 300, and a rocking element 400 that is rotatably mounted; one end of the rocking element 400 is a free end 410 abutting against the second housing 110, and opposite end of the rocking element 400 is a pressing end 420 pressing down on the obstruction detecting switch 310; the free end 410, when being rotated, drives the pressing end 420 to be disengaged from the obstruction detecting switch 310, whereby an obstruction signal is generated.

The obstruction detecting apparatus disclosed herein may be installed on a piece of equipment so that the equipment has an anti-collision feature. The equipment may be an electric lifting desk, an electric lifting bed, and the like, which is demanding on obstruction detecting accuracy. The first housing 100 and the second housing 110 may move relative to each other. In a normal state, the first elastic member 200 maintains a normal length, with the pressing end 420 of the rocking element 400 pressing down on the obstruction detecting switch 310, and when moving with the equipment, the obstruction detecting apparatus generally moves in a direction from the first housing 100 towards the second housing 110 or in a direction from the second housing 110 towards the first housing 100. In an obstructed situation, movement of one of the first housing 100 and the second housing 110 is affected, with quick deceleration of movement speed; since the other housing still has inertia, the first housing 100 and the second housing 110 would move relative to each other, so that the spacing therebetween would be shrunk. The second housing 110 pushes the free end 410 of the rocking element 400 to drive the rocking element 400 to rotate, causing the pressing end 420 to be disengaged from the obstruction detecting switch 310, whereby an obstruction signal may be generated.

In an existing technical solution, when an obstruction is encountered, an obstruction signal is generated by pressing a pushbutton switch; after the signal is detected, the equipment would still move due to a response time interval from system control to motor action as well as inertia of the motor. In contrast, in the present application, a small displacement of the second housing 110 relative to the first housing 100 may lift the pressing end 420 off the obstruction detecting switch 310, which reduces buffer button travel and eliminates actuation travel error of the pushbutton switch while realizing obstruction detection and reversal movement under circumstances of a fast moving speed, thereby preventing damages otherwise caused by further movement of the obstructed equipment; the more sensitive, reliable signal detection and control enables quick detection of occurrence of an obstruction, notably enhancing equipment safety. After the obstruction situation is cleared, the first housing 100 and the second housing 110 are reset by virtue of the elastic force of the first elastic member 200, and the pressing end 420 of the rocking element 400 is also reset to press against the obstruction detecting switch 310, whereby the obstruction alarm is deactivated. The obstruction detection apparatus disclosed herein is applicable to equipment which is demanding on obstruction detection sensitivity, e.g., an electric lifting desk, which shall prevent people from getting pinched; in addition, the obstruction detection apparatus disclosed herein is also applicable to equipment with a fast-moving speed, where the high sensitivity prevents the equipment from moving farther upon encountering an obstruction.

The obstruction detecting apparatus as a whole is floatingly mounted at a bottom portion of the equipment, so that resistance magnitude of the obstruction has no impact on equipment load.

The obstruction detecting switch 310 noted supra is a normally off pushbutton switch; when the pressing end 420 presses down on the obstruction detecting switch 310, the obstruction detecting switch 310 is in an open state; when the pressing end 420 is disengaged from the obstruction detecting switch 310, the obstruction detecting switch 310 is conducted to generate a signal, i.e., an obstruction detection signal. Of course, the obstruction detecting switch may also be a tactile switch, in which case when the pressing end touches the obstruction detecting switch, the obstruction detecting switch is in a closed state to generate a signal; after the pressing end is disengaged from the obstruction detecting switch, the signal is interrupted; therefore, obstruction is determined if signal interruption is detected.

The first elastic member 200 is configured to maintain floating mounting between the first housing 100 and the second housing 110 and provide an elastic force for resetting the first housing 100 and the second housing 110 after their relative movement. To guarantee that the rocking element 400 can maintain engagement between the free end 410 and the second housing 110, and to guarantee that the pressing end 420, after the first housing 100 and the second housing 110 are reset, can re-press down on the obstruction detecting switch 310, a second elastic member 430 is provided for the corresponding rocking element. The second elastic member 430 applies an elastic force to the rocking element 400 to maintain the free end 410 abutting against the second housing 110. The second elastic member 430 can be deformed as the rocking element 400 rotates, and deformation of the second elastic member 430 does not affect the second elastic member 430 from exerting the elastic force against the rocking element 400. The first housing 100 has a pin shaft 440 provided thereon, the rocking element 400 being rotatably mounted on the pin shaft 440. A torsional spring is also disposed on the pin shaft 440, one leg of the torsion spring being secured to the rocking element 400, the other leg thereof being secured to the pin shaft 440. In an example implementation, the second elastic member 430 is a torsional spring, and a torsional force generated by rotating of the rocking element 400 is well suitable for the torsional spring. Of course, the second elastic member may also be a spring disposed on the first housing or the second housing and connected to the rocking element.

The second elastic element 430 provides an elastic force applied against the rocking element 400; therefore, when the rocking element 400 engages with the second housing 110, a certain acting force would be applied against the second housing 110. To ensure sensitivity of the obstruction detecting apparatus, the rocking element 400 is of an elongated bar structure, and a distance between the free end 410 and the pin shaft 440 is greater than a distance between the pressing end 420 and the pin shaft 440, so that according to the lever principle, a small acting force against the free end 410 would drive the rocking element 400 to rotate, causing the pressing end 420 to be disengaged from the obstruction detecting switch 310; in this way, the reactive force of the rocking element 400 has little impact on the relative movement between the first housing 100 and the second housing 110, which guarantees sensitivity of the obstruction detecting apparatus.

FIGS. 2 to 7 specifically illustrate a structure of the rocking element 400 in one example implementation of the disclosure on the basis of the example embodiments described supra.

Figure 2:
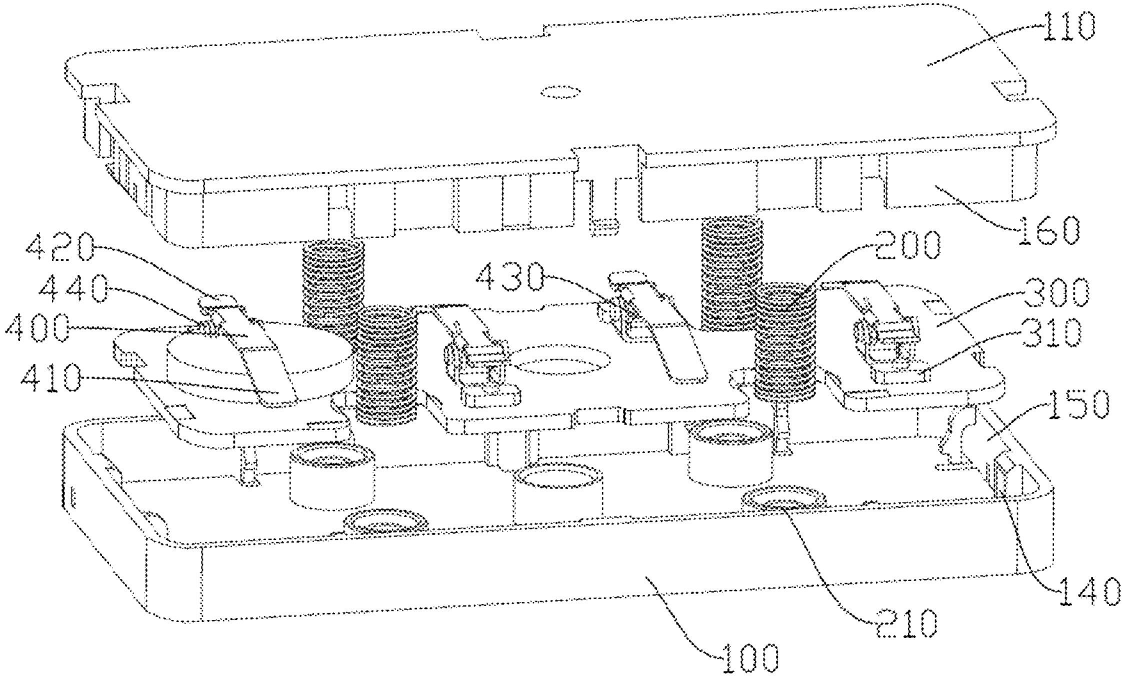
FIG. 2 is an exploded view of the obstruction detecting apparatus according to some embodiments of the disclosure.
Figure 3:
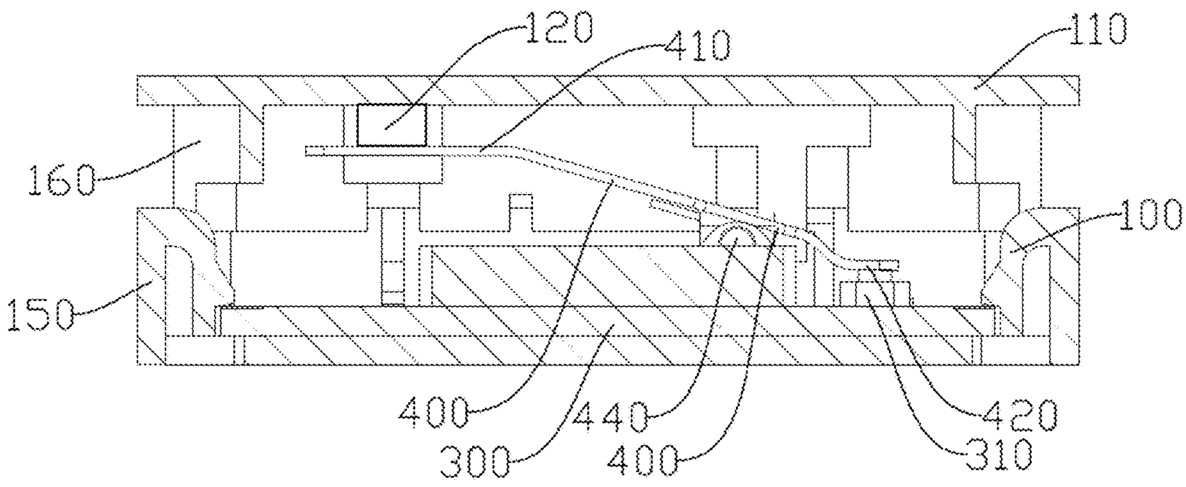
FIG. 3 is a sectional view of the obstruction detecting apparatus according to some embodiments of the disclosure.
Figure 4:
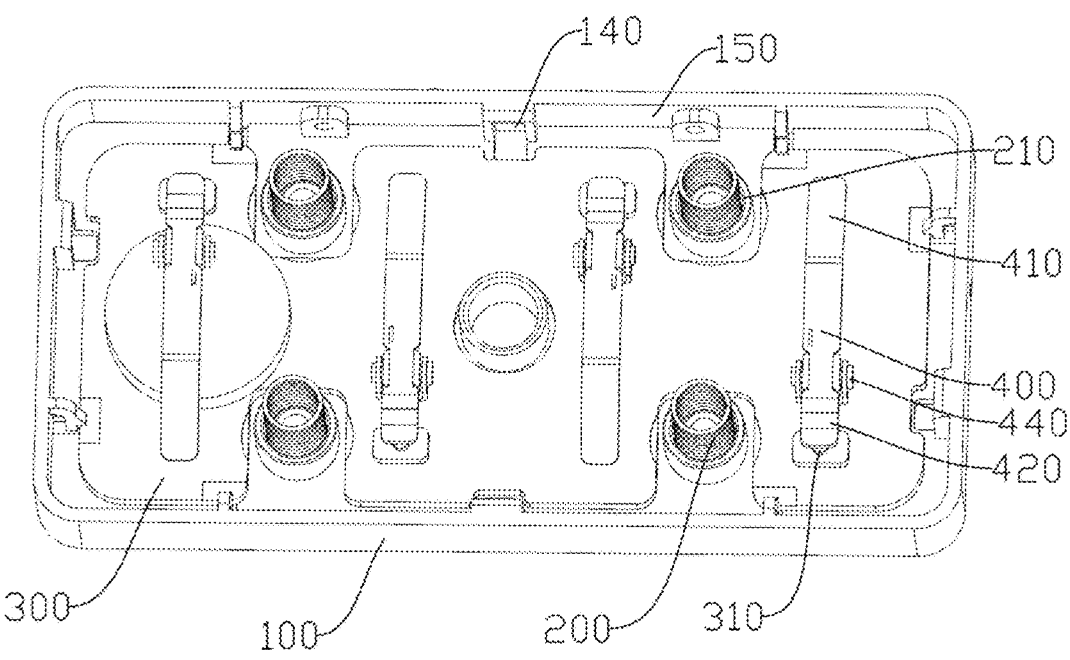
FIG. 4 is an internal structural schematic diagram of the obstruction detecting apparatus according to some embodiments of the disclosure.

In FIGS. 2 to 4, the rocking element 400 is a rocking paddle, the free end 410 being formed by inclined extension of the rocking element 400 from position of the pin shaft 440 towards the second housing 110, the pressing end 420 being formed by inclined extension of the rocking element 400 from position of the pin shaft 440 towards the obstruction detecting switch 310.

Figure 5:
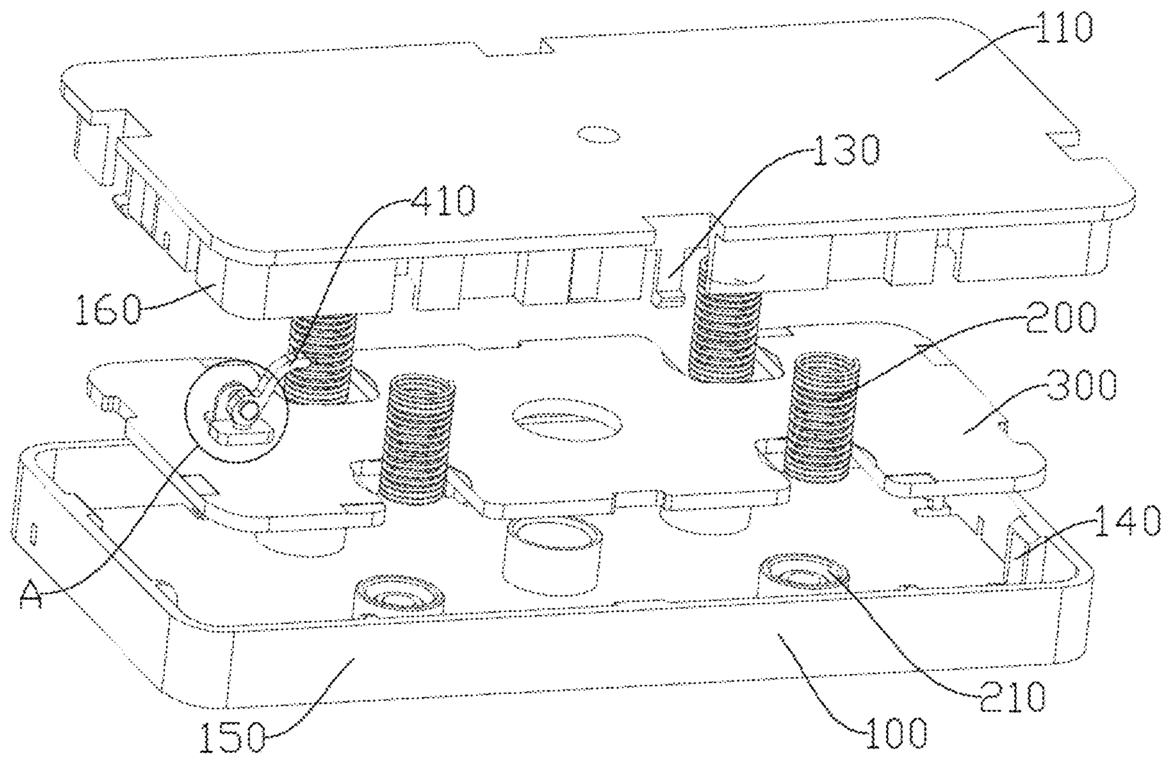
FIG. 5 is a structural schematic diagram of another obstruction detecting apparatus according to some embodiments of the disclosure.
Figure 6:
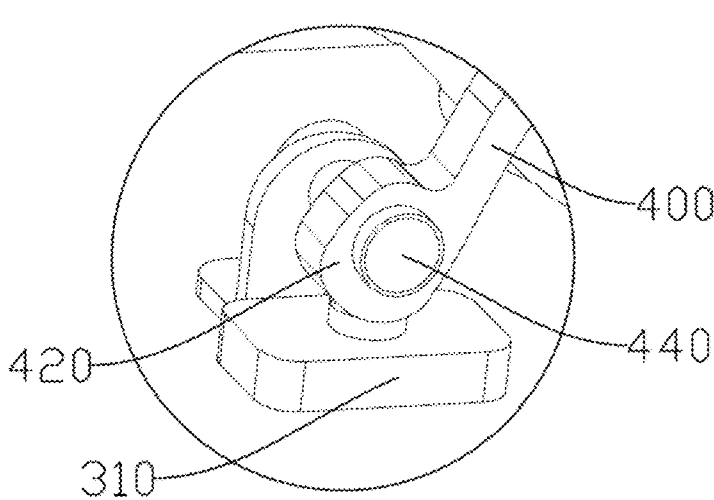
FIG. 6 is an enlarged schematic view of part A in FIG. 5.
Figure 7:
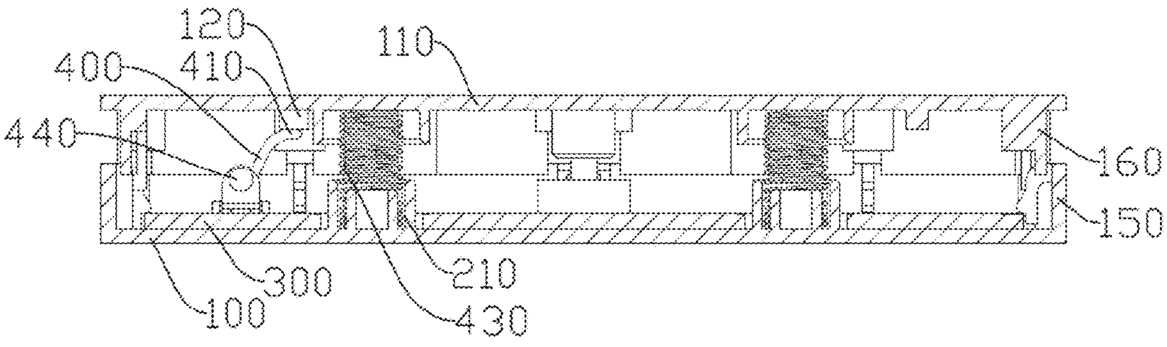
FIG. 7 is a sectional view of another obstruction detecting apparatus according to some embodiments of the disclosure.

Or, referring to FIGS. 5 to 7, the pressing end 420 of the rocking element 400 is rotatably mounted on the pin shaft 440, the free end 410 being formed by inclined extension of the rocking element 400 from the pressing end 420 towards the second housing 110; the pressing end 420 has a cam shape; the cam-shaped pressing end 420 has a raised portion, so that when the obstruction detecting apparatus is in a normal state, the raised portion on the pressing end 420 presses down on the obstruction detecting switch 310; with rotation of the rocking element 400, the raised portion is gradually disengaged from the obstruction detecting switch 310, whereby an obstruction signal is generated.

FIG. 3 or 7 illustrates an implementation of the disclosure on the basis of the embodiments described supra; a boss 120 oriented towards the first housing 100 is provided on the second housing 110, the boss 120 maintaining abutting against the free end 410. With the boss 120 provided, the free end 410 does not need direct contact with the second housing 110, which may reduce length of the rocking element 400, thereby preventing increase of assembly difficulty as well as increase of size of the obstruction detecting apparatus otherwise caused by a too long rocking element 400.

To guarantee detection sensitivity of the obstruction detecting apparatus, in one example implementation of the disclosure, multiple obstruction detecting switches 310 and multiple rocking elements 400 are provided between the first housing 100 and the second housing 110, as illustrated in FIG. 2 and FIG. 4.

Provided that only one obstruction detecting switch 310 and one rocking element 400 were set, if an obstructed position of the first housing 100 and the second housing 110 is away from position of rocking element 400, the first housing 100 and the second housing 110 need to move relative to each other so as to drive the rocking element 400 to rotate; however, certain time already elapses from the time point when the equipment encounters the obstruction, and the amount of displacement of the equipment within this period of time would very likely cause damages and accidents. By setting multiple obstruction detecting switches 310 and multiple rocking elements 400, the obstruction detecting apparatus can always generate an obstruction signal quickly wherever the obstruction occurs.

In addition, as an example implementation, directions of two neighboring obstruction detecting switches 310 are set oppositely, so are the directions of two neighboring rocking elements 400. For example, as shown in FIG. 4, for the rocking element 400 at the utmost right side, its free end 410 is located above while its pressing end 420 is located below, while for the adjacent rocking element 400, its free end 410 is located below while its pressing end 420 is located above. It is noted that, the orientations of above, below, left, and right referred to herein are the directions illustrated in FIG. 4, which do not represent directions in actual equipment.

In one example embodiment of the disclosure, specifically:

a snap 130 is provided on the second housing 110, and a catch groove 140 fitted with the snap 130 is provided on the first housing 100, the snap 130 being slidably mounted in the catch groove 140, as illustrated in FIGS. 2 and 5. Fitting between the snap 130 and the catch groove 140 may limit the second housing 110 to the first housing 100, thereby preventing separation between the first housing 100 and the second housing 110.

A first encirclement 150, which is continuous and raised towards the second housing 110 direction, is provided at an edge of the first housing 100, and a second encirclement 160, which is continuous and raised towards the first housing 100 direction, is provided at an edge of the second housing 110, the first encirclement 150 enclosing the second encirclement 160, the snap 130 being disposed on the second encirclement 160, the catch groove 140 being disposed on the first encirclement 150. After the snap 130 is snapped into the catch groove 140, an inner wall of the catch groove 140 plays a role of limiting the snap 130, whereby the snap 130 is limited in the catch groove 140, realizing assembly between the first housing 100 and the second housing 110.

In this example embodiment, the first elastic member 200 is a spring; a spring slot 210 for mounting the spring is provided on the first housing 100 and/or the second housing 110. Compared with an elastomer such as a silicone piece or a rubber piece, the spring has a better extensibility and retractability, which may be quickly deformed to generate an obstruction signal when the obstruction detecting apparatus encounters an obstruction. The spring slot 210 is configured to receive an end portion of the spring so as to position the spring and limit radial displacement of the end portion position of the spring. Under the action of the first elastic member 200, the snap 130 abuts against the top wall of the catch groove 140 in a normal state, thereby guaranteeing an enough obstruction buffer distance.

Figure 8:
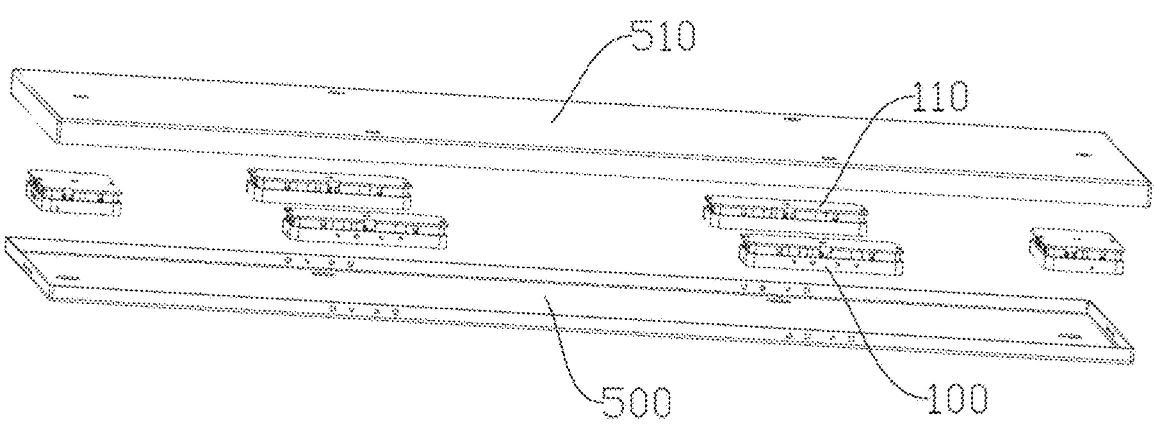
FIG. 8 is a structural schematic diagram of an obstruction detecting system according to some embodiments of the disclosure.

Referring to FIG. 8, the disclosure further provides an obstruction detecting system employing the obstruction detection apparatus described supra. The obstruction detecting system comprises a first board body 500 and a second board body 510, a plurality of the obstruction detecting apparatuses as described supra being disposed between the first board body 500 and the second board body 510; in this example embodiment, the first housing 100 and the first board body 500 are securely connected, and the second housing 110 and the second board body 510 are securely connected. Since the obstruction detecting apparatus described supra has a small size, its detection range would be limited when being applied to large equipment, so that an obstruction signal cannot be generated timely. Therefore, the obstruction detecting system employs a plurality of anti-collision detecting apparatuses, so that an obstruction signal can always be generated quickly wherever the first board body 500 and the second board body 510 encounter an obstruction. Dependent on size of the equipment actually used, sizes of the first board body 500 and the second board body 510 may be adjusted; the number of the obstruction detection apparatuses may also be adjusted accordingly. Of course, the obstruction detecting apparatus described supra may also be independently arranged in small equipment or some small areas of large equipment.

The disclosure further discloses an electric lifting desk. The electric lifting desk belongs to smart furniture. With the obstruction detecting system described supra, the electric lifting desk has a strong obstruction detection capability; when the moving electric lifting desk encounters an obstruction which potentially gets the user pinched, the electric lifting desk may quickly detect the obstruction to prevent the user from being pinched. In addition, the obstruction detection system may also be applied to equipment such as an electric lifting bed.

The disclosure further disclosed an electric lifting cupboard. The electric lifting cupboard belongs to smart furniture. With the obstruction detecting system described supra, an obstruction in the way of up and down movement of a cupboard body of the electric lifting cupboard may be quickly detected.

What have been described above are only example embodiments of the present disclosure; however, the protection scope of the present disclosure is not limited thereto. A person skilled in the art should understand that the disclosure includes, but is not limited to, the contents described in the drawings and the embodiments. Any modifications without departing from the functions and structural principles of the disclosure will be included within the scope of the claims.

We claim:

1. An obstruction detecting apparatus, comprising a first housing and a second housing, the second housing being floatingly mounted on the first housing via a first elastic member, on the first housing being provided a circuit board, an obstruction detecting switch connected to the circuit board, and a rocking element rotatably mounted, one end of the rocking element being a free end abutting against the second housing, opposite end of the rocking element being a pressing end pressing down on the obstruction detecting switch, the free end, when being rotated, driving the pressing end to be disengaged from the obstruction detecting switch, whereby an obstruction signal is generated; wherein a distance between the free end and a center of rotation of the rocking element is greater than a distance between the pressing end and the center of rotation of the rocking element.

2. The obstruction detecting apparatus according to claim 1, wherein a boss oriented towards the first housing is provided on the second housing, the boss maintaining engagement with the free end.

3. The obstruction detecting apparatus according to claim 1, wherein a second elastic member is provided on the first housing or the second housing, the second elastic member applying, against the rocking element, an elastic force causing the free end to keep abutting against the second housing.

4. The obstruction detecting apparatus according to claim 1, wherein a pin shaft is provided on the first housing, the rocking element being rotatably mounted on the pin shaft, the free end being formed by inclined extension of the rocking element from a position of the pin shaft towards the second housing, the pressing end being formed by inclined extension of the rocking element from the position of the pin shaft towards the obstruction detecting switch.

5. The obstruction detecting apparatus according to claim 1, wherein a pin shaft is provided on the first housing, the pressing end being of a cam shape and rotatably fitted with the pin shaft, the free end being formed by inclined extension of the rocking element from the pressing end towards the second housing.

6. The obstruction detecting apparatus according to claim 1, wherein a snap is provided on one of the first housing and the second housing, and a catch groove fitted with the snap is provided on the other one of the first housing and the second housing, the snap being slidably mounted in the catch groove.

7. The obstruction detecting apparatus according to claim 1, wherein the first elastic member is a spring, and a spring slot for mounting the spring is provided on the first housing and/or the second housing.

8. The obstruction detecting apparatus according to claim 1, wherein multiple obstruction detecting switches and multiple rocking elements are provided between the first housing and the second housing.

9. An obstruction detecting system, comprising a first board body and a second board body, a plurality of obstruction detecting apparatuses being disposed between the first board body and the second board body, the obstruction detecting apparatuses being the obstruction detecting apparatus according to claim 1, the first housing being securely connected to the first board body, the second housing being securely connected to the second board body.

* * * * *